S. A. DAVIS.
TURNING AXLE SPINDLE.
APPLICATION FILED APR. 22, 1908.
905,410.
Patented Dec. 1, 1908.
2 SHEETS—SHEET 1.
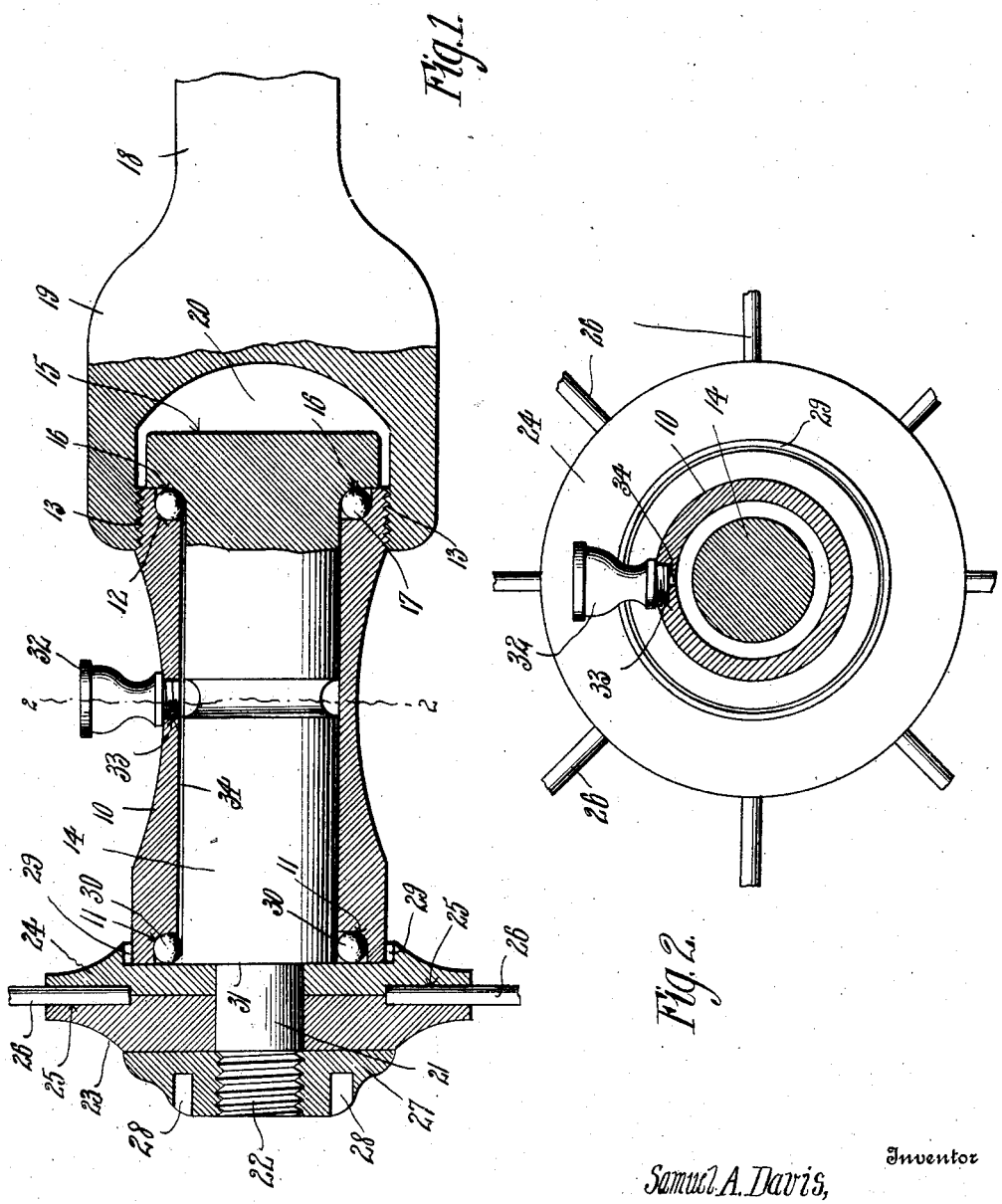
Witnesses
J. H. Crawford
C. N. Woodward
Inventor
Samuel A. Davis,
By Chandler & Chandler
Attorneys S. A. DAVIS.
TURNING AXLE SPINDLE.
APPLICATION FILED APR. 22, 1908.
905,410.
Patented Dec. 1, 1908.
2 SHEETS—SHEET 2.
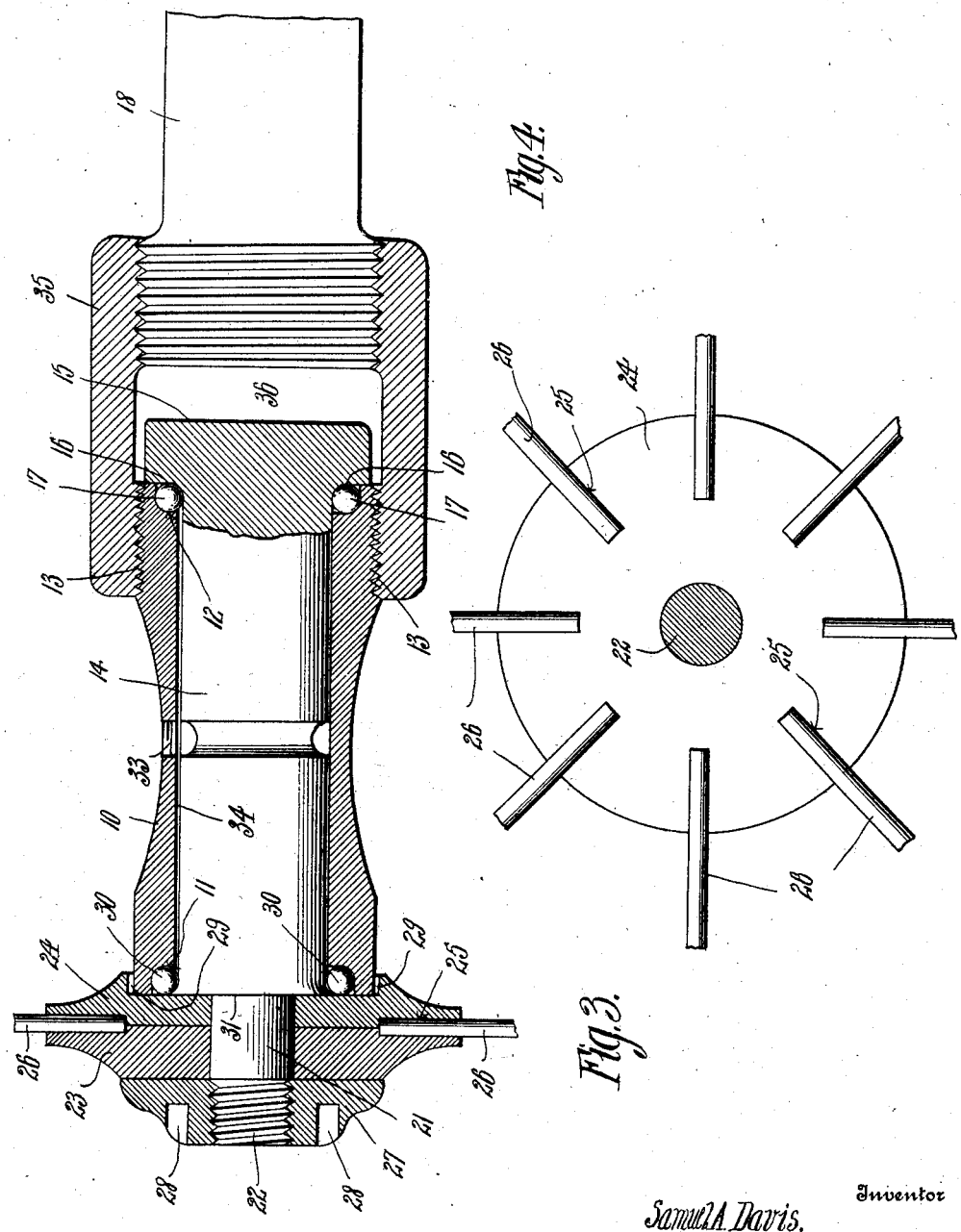
Witnesses
J. H. Crawford
C. N. Woodward
Inventor
Samuel A. Davis,
By Chandler & Chandler
Attorneys.

UNITED STATES PATENT OFFICE.

SAMUEL A. DAVIS, OF MARTEL, FLORIDA.

TURNING AXLE-SPINDLE.

No. 905,410.  Specification of Letters Patent.  Patented Dec. 1, 1908.

Application filed April 22, 1908. Serial No. 428,550.

*To all whom it may concern:*

Be it known that I, SAMUEL A. DAVIS, a citizen of the United States, residing at Martel, in the county of Marion, State of Florida, have invented certain new and useful Improvements in Turning Axle-Spindles; and I do hereby declare the following to be a full, clear, and exact description of the invention, such as will enable others skilled in the art to which it appertains to make and use the same.

This invention relates to axle spindles, more particularly to the class of devices of this character known as "turning spindles", and has for one of its objects to simplify and improve the construction and increase the efficiency of devices of this character.

Another object of the invention is to provide a simply constructed device of this character which may be readily attached to and disconnected from the body of the axle, and which may also be dismembered for replacing broken parts or other repairs, and which may also be readily lubricated without removing the wheel.

Another object of the invention is to materially cheapen the construction without decreasing the efficiency and utility.

Another object of the invention is to produce a simply constructed device of this character which is strong and durable and not easily broken or affected by contact with obstructions, such as trees, stumps, and the like.

Another object of the invention is to provide a device of this character which may be readily adapted to vehicles of various sizes without materially changing the structure.

Another object of the invention is to provide a simply constructed device of this character wherein broken spokes may be readily replaced in the wheel without discarding the other parts of the structure, or even removing the wheel from the spindle.

With these and other objects in view the invention consists in certain novel features of construction hereafter shown and described and then specifically pointed out in the claim, and in the drawings illustrating the preferred embodiment of the invention, Figure 1 is a longitudinal sectional elevation, Fig. 2 is a section on the line 2—2 of Fig. 1, and, Fig. 3 is an end elevation of the hub portion of the device with the binding nut and the outer hub member removed.

Fig. 4 is a sectional detail illustrating a modification in the construction.

The improved device comprises a tubular sleeve 10 having a half bearing 11 for balls in the outer end, and a half bearing 12 for balls in the inner end, the inner end being also externally threaded as at 13.

The spindle represented at 14 extends through the sleeve 10 and is enlarged at the inner end as at 15 and with a half bearing 16 for balls in the inner face of the projection 15, the half bearing 16 opposing the half bearings 12 of the sleeve, and supporting a plurality of balls 17 between them, as shown.

The axle body represented at 18 is enlarged at the outer end as at 19 and provided with a cavity 20 in the end and with the cavity internally threaded at its outer end to engage the threaded portion 13 of the sleeve, by which means the axle is detachably united to the sleeve.

The outer end of the spindle 14 is reduced as at 21, and threaded externally of the reduced portion as at 22. Bearing upon the portion 21 of the spindle is a divided hub formed in two parts 23—24 and with spoke sockets 25 in the confronting faces of the two parts of the hub, the sockets adapted to receive the inner ends of the spokes 26, as shown.

Engaging the threaded portion 22 of the spindle is a binding nut 27, preferably provided with oppositely disposed apertures 28 to receive a pin wrench of the usual construction to enable the nut to be applied or removed.

The inner hub member 24 is provided with a recess 29 bearing over the outer end of the sleeve 10, and against the bottom of which a plurality of balls 30 bear, the balls supported in the half bearing 11 of the sleeve.

The reduced portion 21 of the spindle provides a shoulder 31 against which the inner hub member 24 bears, and is clamped in that position by the nut 27 and the outer hub member 23, as will be obvious.

An oil cup 32 of suitable construction is connected to the sleeve 10 by means of an aperture 33 in one side thereof, so that a suitable lubricant may be supplied to the interior of the sleeve and thus lubricate the same, the cavity 20 also receiving a share of the lubricant and serving as a reservoir therefor.

The spindle 14 is provided with an annular groove opposite the oil cup 32, and the inner face of the sleeve 10 is provided with a longitudinal groove 34, the annular groove and the longitudinal groove acting to distribute the lubricating material uniformly over the whole surface of the journal, the rear end of the groove 34 leading into the space between the enlarged end 15 of the spindle and the cavity 20 in the axle, so that the lubricating material will fill this cavity and thus serve as a reservoir as above noted.

The balls 17—30 are arranged to bear upon the spindle as well as against the enlarged head 15 and the hub member 24, and thus materially reduce the friction.

In Fig. 4 a modification in the construction is shown consisting in threading the outer ends of the axle body 18 and providing an internally threaded sleeve 35 engaging the threaded end of the axle and the threads 13 of the sleeve, and thus coupling the axle body to the sleeve. In this modified construction a space 36 is formed between the outer end of the axle body and the enlargement 15 of the spindle to form an oil reservoir similar to the oil reservoir 20 in the structure shown in Fig. 1. The modification noted does not depart from the principle of the invention, as the operation is substantially the same as the structure shown in Fig. 1.

By this simple means it will be obvious that a simply constructed device is produced which may be inexpensively manufactured, and applied at small expense to axle bodies of various kinds and for various purposes and may be adapted by making slight modifications to vehicles of any character from the lightest buggies to the heaviest automobiles or freight trucks, and will operate with equal facility upon any form of vehicle to which it may be attached.

What is claimed, is:—

A device of the class described comprising a tubular sleeve externally threaded at the inner end, a spindle extending through said sleeve and with an enlarged inner end bearing against the inner end of the same and with a threaded outer end, a wheel hub mounted upon said spindle and provided with a recess bearing over the outer end of said spindle, a clamp nut engaging the threaded end of said spindle and bearing against said hub, an axle body having a recess in its end and internally threaded and engaging the threaded portion of said sleeve, and means for supplying lubricating material to the interior of said sleeve and filling said sleeve and the cavity in said axle body.

In testimony whereof, I affix my signature, in presence of two witnesses.

SAMUEL A. DAVIS.

Witnesses:
D. A. CLARK,
L. H. PILLANS.